March 30, 1954     A. A. MILLER ET AL     2,673,633
TORQUE AND SPEED RESPONSIVE CLUTCH
Filed April 19, 1948     4 Sheets-Sheet 2
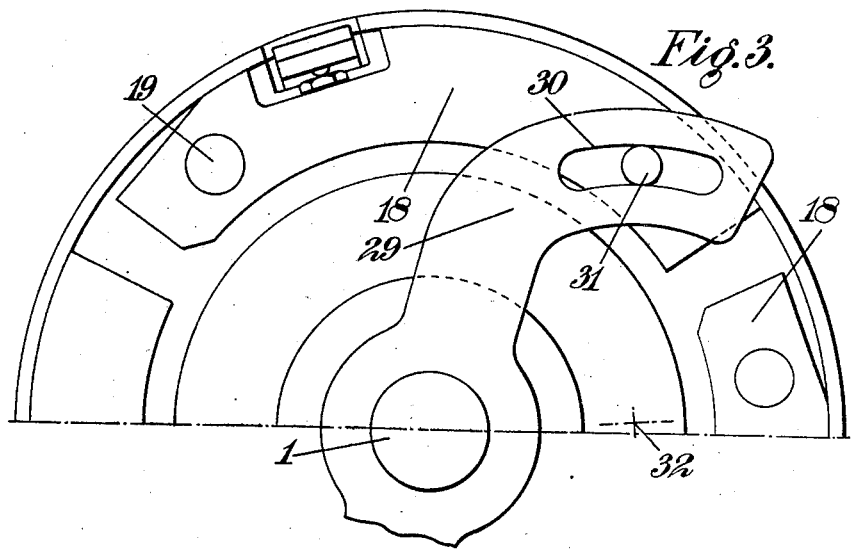
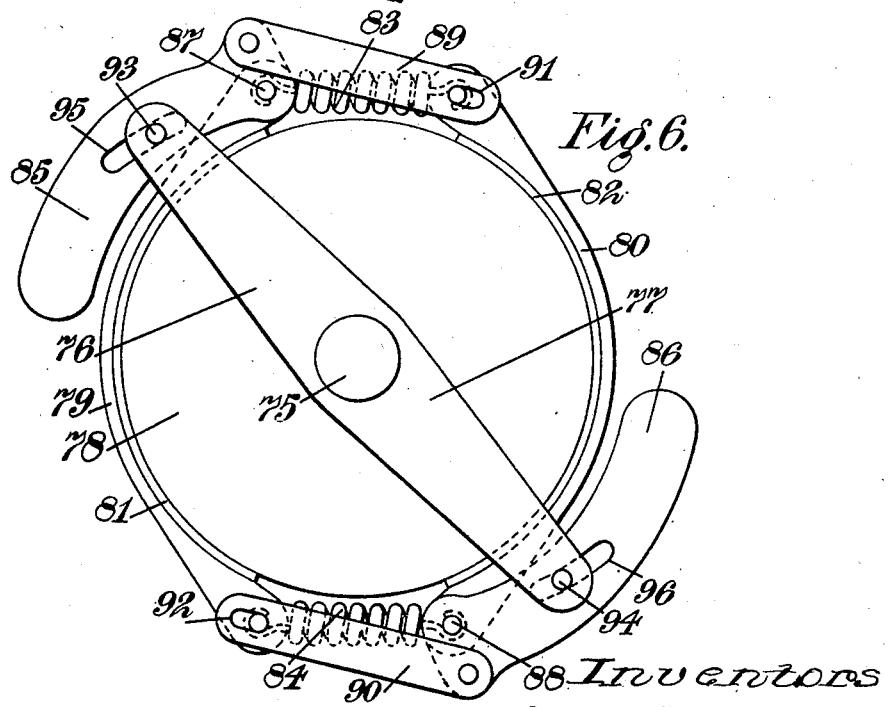
Inventors
A. A. Miller
A. G. Wilson

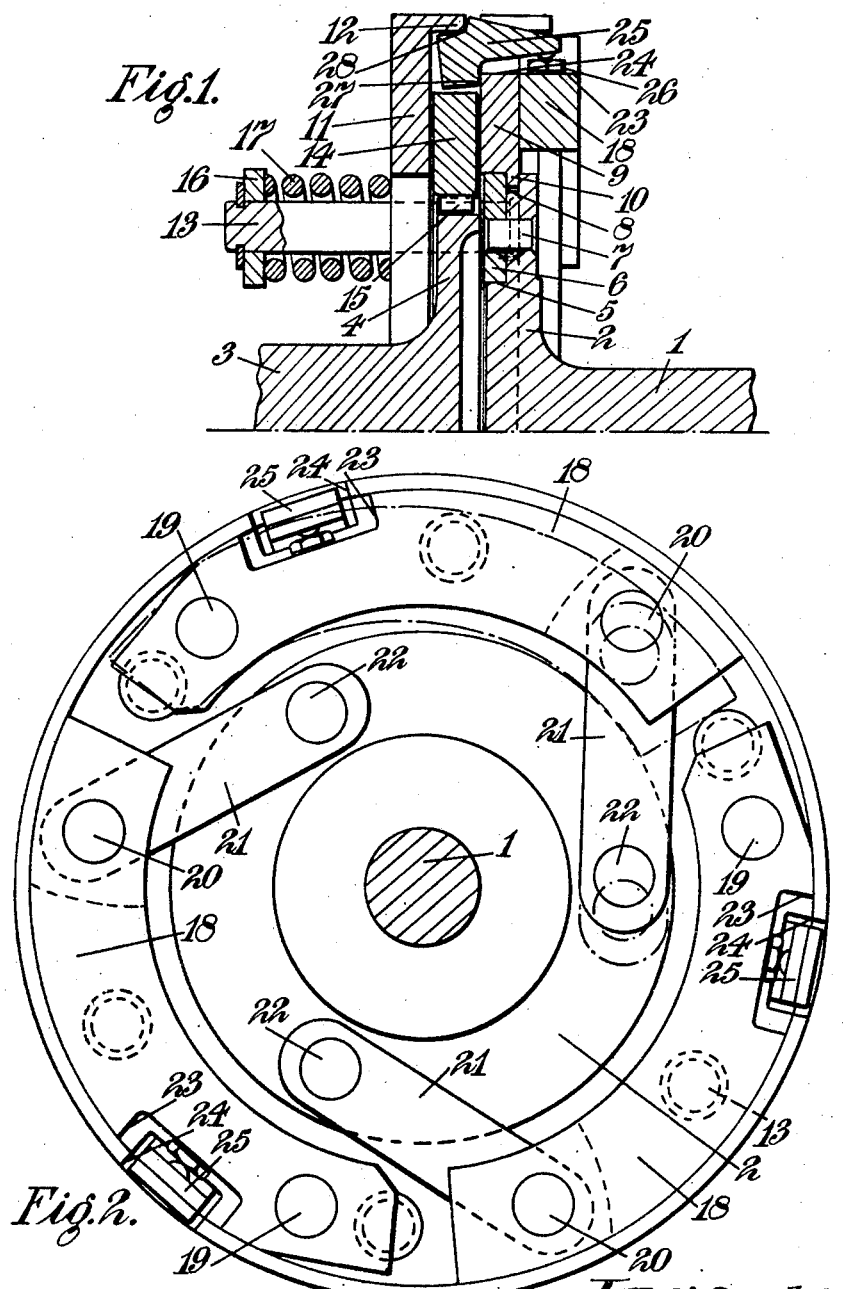

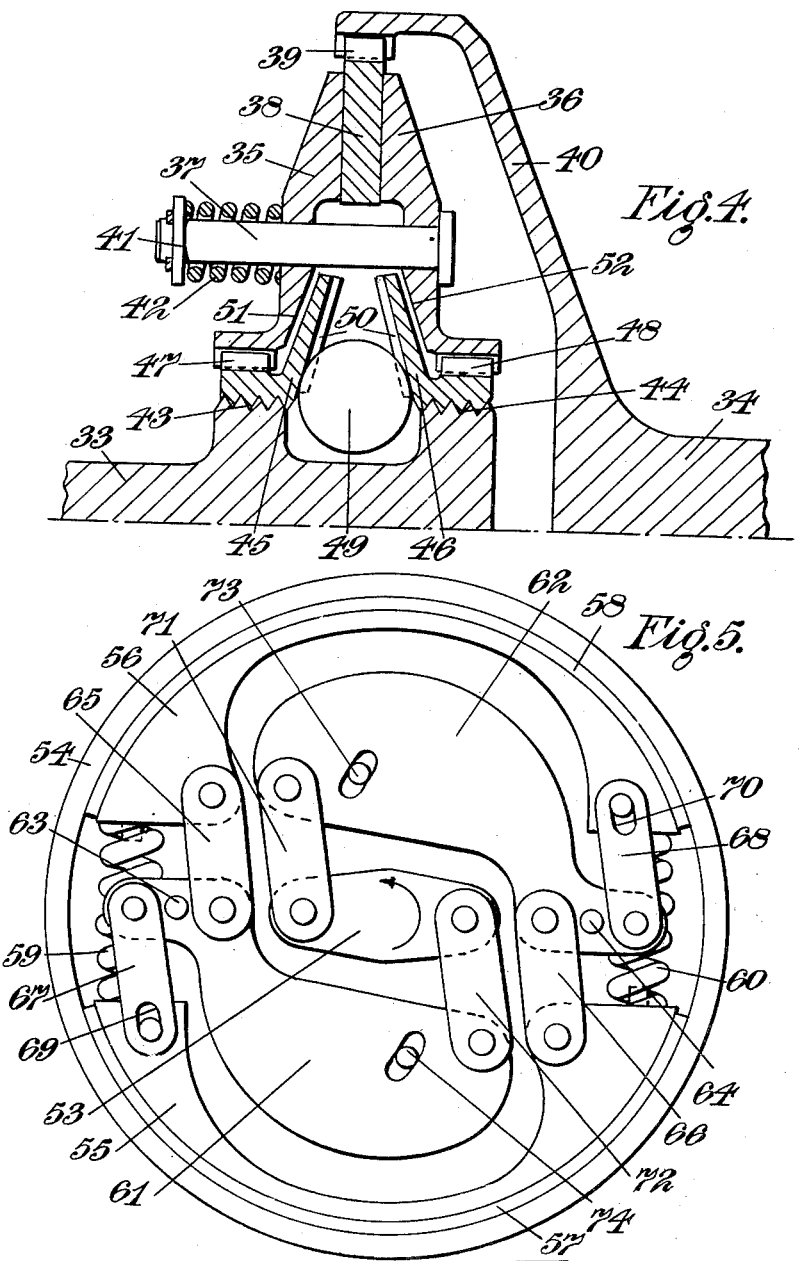

March 30, 1954 — A. A. MILLER ET AL — 2,673,633
TORQUE AND SPEED RESPONSIVE CLUTCH
Filed April 19, 1948 — 4 Sheets-Sheet 4

Inventors
A. A. Miller
A. G. Wilson

Patented Mar. 30, 1954

2,673,633

UNITED STATES PATENT OFFICE 2,673,633

TORQUE AND SPEED RESPONSIVE CLUTCH

Albert Arthur Miller and Andrew Gordon Wilson, Coventry, England, assignors to Self-Changing Gear Company Limited, Coventry, England Application April 19, 1948, Serial No. 21,884

Claims priority, application Great Britain April 22, 1947

18 Claims. (Cl. 192—104)

This invention relates to centrifugally operated clutches and associated mechanisms, in which operation of the clutch is effected in accordance with the angular velocity of the rotating parts, and one of the objects of the invention is to provide an improved clutch of this character which provides positive engagement and disengagement as speeds more closely approaching a predetermined speed or speeds than has hitherto been attained. Another object is to provide an improved clutch of this character affording smooth and progressive operation without shock and in which engagement and disengagement is effected with certainty at or near the predetermined speed or speeds.

The invention may be applied with especial advantage to transmissions including change-speed gearing where operation of the clutch brings about a change in the gear ratio, and a further object is to provide an improved transmission mechanism embodying such an arrangement. It is to be understood, however, that the invention is not limited to employment in conjunction with such change-speed mechanisms.

The invention consists in a centrifugally operated friction clutch in which operation of the centrifugal means is controlled by means dependent upon the transmitted torque in such a manner as to afford progressive engagement or disengagement of the friction elements.

The invention also consists in a centrifugally operated friction clutch in which the centrifugal action is opposed by a reaction, proportional to the transmitted torque, afforded by connected or engaged elements forming part of the drive so that engagement or disengagement is dependent upon the said reaction exceeding the centrifugal action or vice versa.

According to a further feature of the invention, the force or reaction exerted by the means controlling or opposing the centrifugal action is limited independently of the applied torque and this may be achieved in accordance with a further feature of the invention by limiting the gripping power of the clutch. Such desired limitation may conveniently be obtained by employing springs for effecting the required gripping pressure between the clutch friction surfaces, arranged so that the gripping power is limited by the spring force provided and the maximum gripping power is unaffected by either the centrifugal or the reaction forces.

Disengagement of the friction clutch elements may be effected through lever means arranged so that the levers will return under spring or other action when the centrifugally acting force is reduced to a predetermined limit.

According to a further feature of the invention the drive of one of the clutch elements is effected through the centrifugal weights, the radial displacement of which is controlled by link means or by engaged cam or like surfaces forming part of the drive and arranged to produce a reaction proportional to the transmitted torque, which reaction opposes the centrifugal force of the weights. Thus in a convenient arrangement the weights are pivotally mounted for oscillation on a rotating element, which may be a clutch part, and are driven by a link or by the engagement of a pin or other follower on the weight with a cam slot in a driving member, the link or slot being disposed to exert an inward reaction on the weight in accordance with the torque and opposing the centrifugal force of the pivoted weights. Radial movement of the weights is employed to actuate trip means for disengaging the friction clutch.

According to a further feature of the invention the clutch comprises a pair of driving plates held in engagement with an interposed driven plate by spring means, and disengaged by bell-crank levers having an arm extending between the driving plates and another arm engageable by the centrifugal weight. The spring means may comprise coil springs lying parallel to the axis of rotation so that their action is substantially unaffected by centrifugal force acting on their own masses. Alternatively the spring means may comprise laminated springs.

In other arrangements the clutch elements comprise brake shoes of either internal expanding or external contracting form in conjunction with a drum, the centrifugal weights being arranged so that the drive is effected through them in the manner previously described and so that their outward movement effects disengagement of the brake shoes.

A clutch mechanism having the features previously defined may conveniently and advantageously be associated or combined with change-speed gearing, so that actuation of the clutch effects a change in the gear ratio. Thus according to a further feature of the invention the driven clutch plate referred to previously is connected to a gear train giving an appropriate increase in speed and a uni-directional or free-wheel type of clutch is provided between the input and output shafts. With such an arrangement the drive at lower speeds will be through the engaged friction clutch and gearing, giving a final drive at increased speed with the free-wheel clutch idling. On reaching or exceeding the predetermined speed, the centrifugal weights move outwardly against the torque reaction and disengage the friction clutch by actuation of the trip devices, the drive through the gear train thus interrupted being taken up by the free-wheel clutch so that the final drive is continued at lower speed. Such an arrangement may be advantageously employed where the speed of the shaft from which a drive is taken is liable to considerable variation, and the speed of the driven machine must be restricted to a smaller range of variation, as for example when an electrical generator is driven from a variable speed shaft.

It will be seen that the operation of a friction clutch according to the invention, whether combined with change-speed gearing or otherwise, is dependent upon the resultant of the centrifugal force tending to displace the weights outwardly and the torque reaction opposing such displacement and this control ensures certainty in operation, so that the engagement and disengagement take place at speeds closer to the predetermined speed or speeds than is possible with the majority of centrifugally operated clutches. Under the above conditions the outward displacement of the weights is progressive under increasing speed. In addition the magnitude of the reaction opposing the centrifugal action is limited, since the maximum gripping power of the clutch is determined by the spring means and is independent of the transmitted torque and of the centrifugal action.

In the accompanying drawings:

Figure 1 is a longitudinal section of the upper half of a centrifugally operated clutch mechanism constructed in accordance with the invention;

Figure 2 is an end elevation of the clutch mechanism;

Figure 3 is an end elevation of part of a clutch mechanism as shown in Figures 1 and 2 having a modified arrangement for driving the centrifugal weights;

Figure 4 is a longitudinal section of the upper half of a modified form of centrifugally operated clutch mechanism;

Figure 5 is an end elevation of another modified form of centrifugally operated clutch mechanism employing internal shoe elements;

Figure 6 is an end elevation of another modified form of centrifugally operated clutch mechanism employing external shoe elements;

Figure 7:
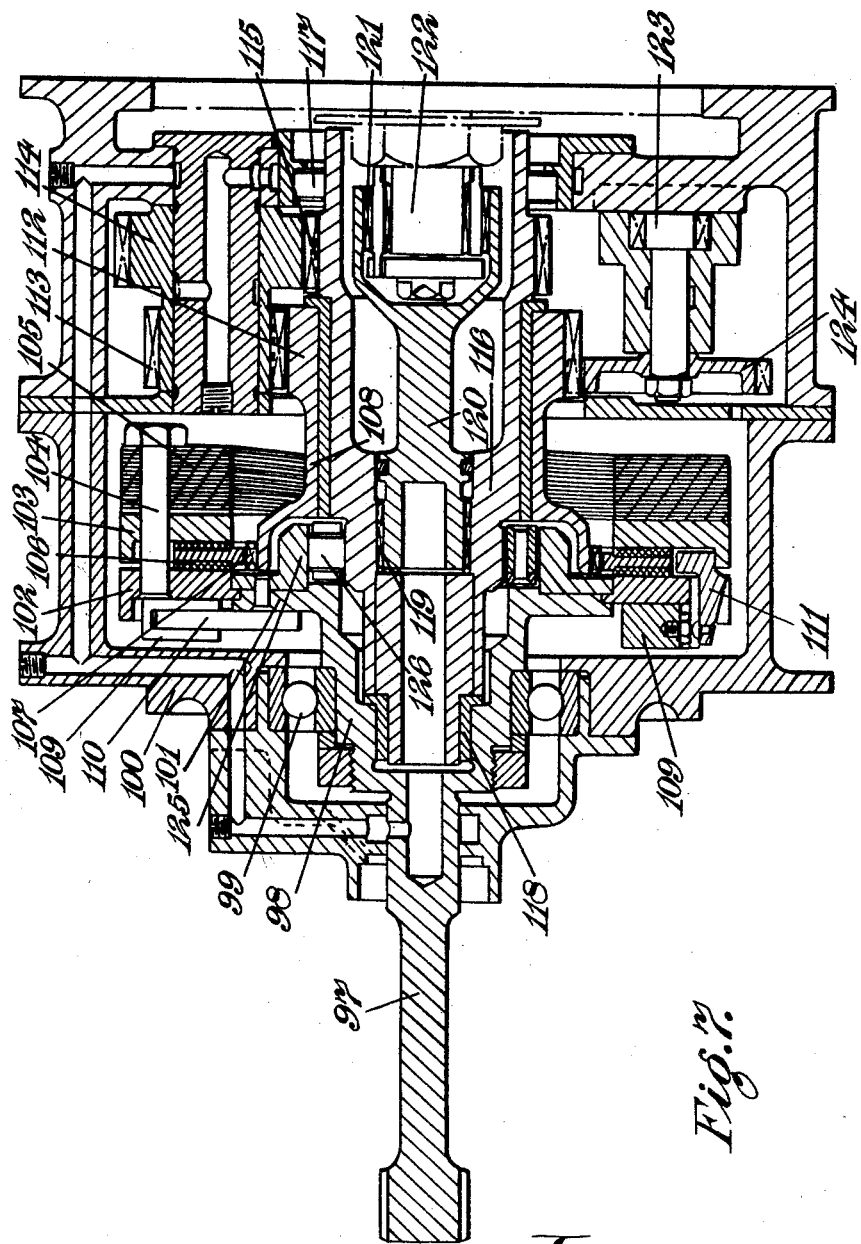
Figure 7 is a longitudinal section of a centrifugally operated clutch mechanism associated with a change-speed gear and a unidirectional or free-wheel clutch, constructed and arranged to operate in accordance with the invention.

In carrying the invention into effect according to one convenient mode as applied to a centrifugally operated clutch mechanism as illustrated in Figures 1 and 2, an input shaft 1 adapted to be connected to the prime mover is formed with an integral flange 2 and is arranged in line with an output shaft 3 which is formed with an integral flange 4. The flange 2 of the input shaft 1 is recessed at 5 and within this recess is secured an annular plate 6 by means of rivets 7. The outermost portion of the recess 5 is counter-recessed to provide a groove 8 between the outer edge of the flange 2 and the plate 6. An outer clutch plate 9 of annular form has an inner extension 10 which is received within the groove 8. A second outer clutch plate 11 encircling the output shaft 3 has an inwardly directed peripheral flange 12 and has a driving connection with the clutch plate 9 by means of pins 13 which are secured to the clutch plate 9 and pass through holes in the plate 11. It will be understood that the pin 13 seen in Figure 1 is located near the periphery of the clutch plate 9. An inner clutch plate 14 is disposed between the plates 9 and 11, and has a driving connection by means of dogs or teeth 15 with the flange 4 on the output shaft 3. The ends of the pins 13 project beyond the clutch plate 11 and are provided with collars 16, between which and the plate are interposed springs 17 which tend to hold the outer clutch plates 9 and 11 in engagement with the inner plate 14. Any convenient number of pins 13 may be provided.

Three centrifugal weights 18 of curved elongated form have their ends pivotally mounted at 19 on the clutch plate 9 and their opposite ends are connected at 20 to links 21 which are connected at 22 to the flange 2 on the input shaft. These links 21, it may be noted, constitute the only driving connection between the input shaft 1 and the outer clutch plates 9 and 11. The centrifugal weights 18 have recesses 23 formed in their outer edges which are aligned with recesses 24 formed in the periphery of the clutch plate 9. These aligned recesses accommodate bell crank trip levers 25, the longer arms of which are adapted to engage abutment screws 26 on the weights 18. The shorter arms of the said bell-crank levers engage the inner face of the clutch plate 9 at 27, and recesses 28 formed in the said levers engage the flange 12 on the outer clutch plate 11 in the manner of a fulcrum.

When the clutch is at rest or the speed of the input shaft 1 is low, the centrifugal weights will lie towards the axis of the mechanism and the springs 17 will force the clutch plates 9 and 11 into gripping engagement with the inner clutch plate 14, the drive being transmitted from the flange 2 through the weights 18 to the plates 9 and 11 and thence from the inner plate 14 to the flange 4 on the output shaft 3. As the speed of the shaft 1 increases, the weights tend to move outwardly about their pivots 19 on the clutch plate 9, but this tendency is resisted by a force proportional to the transmitted torque caused by the inward pull exerted on the ends of the weights by the links 21. As this reaction force is progressively overcome by centrifugal force as the speed increases, the outward movement of the weights tilts the bellcrank levers 25 into the position shown in Figure 1 and their shorter arms force the clutch plates 9 and 11 apart so that they are disengaged from the inner clutch plate 14 and the drive is thereby interrupted. It will be noted that slight relative rotation between flange 2 and plate 9 occurs when disengagement takes place. By reason of the reduction in the transmitted torque when the clutch plates commence to slip and the consequential reduction in the reaction force acting on the weights through the links 21, the separating force acting on the outer clutch plates 9 and 11 increases and thus affords a rapid or snap action in disengaging the clutch plates.

If the speed of the shaft 1 is subsequently reduced, the inward force due to the springs 17 acting through the bell crank trip levers 25 will overcome the centrifugal force and the weights will move inwardly to allow the trip levers to assume their original positions. By reason of the increase in the transmitted torque as the clutch plates commence to engage, and the consequential increase in the reaction force acting on the weights through the links 21 and tending to draw the weights inwardly, the return of the trip levers will also be in the nature of a rapid or snap action.

Instead of employing links as the driving connection between the input shaft and the centrifugal weights as in the previously described example, the modified arrangement illustrated in Figure 3 may be adopted. A series of arms 29 secured to the input shaft have arcuate slots 30 engaging with pins 31 which are mounted at the ends of the centrifugal weights remote from their pivots 19. The arcuate slots 30 are described about centres 32 which correspond to the positions of the pins 22 in Figure 1. Thus the arms 29 will drive the weights 18 and the outward movement of the latter will be opposed by a force, acting through the inclined arcuate slots, which is proportional to the transmitted torque. The general arrangement of the clutch mechanism is otherwise as described in the previous example and the mode of operation is the same.

In carrying the invention into effect according to another mode as illustrated in Figure 4, the input shaft 33 adapted to be connected to the prime mover is arranged coaxially with the output shaft 34. A pair of outer clutch plates 35 and 36 are connected together in driving relation by pins 37 which pass through holes in the plates. An inner clutch plate 38 is disposed between the plates 35 and 36 and is connected by interengaging dogs or teeth 39 to a flange 40 integral with the output shaft 34. The pins 37 project from one side of the clutch plate 35 and are provided with collars 41 and interposed springs 42 which tend to force the outer clutch plates 35 and 36 into driving engagement with the inner clutch plate 38. The input shaft 33 has spaced bosses upon which are formed opposite handed threads 43 and 44 engaging corresponding threads on cone members 45 and 46, and these cone members are in driving connection through interengaging straight splines 47 and 48 with the outer clutch plates 35 and 36. A series of centrifugal weights 49, preferably of spherical form as illustrated, are located in opposed radial grooves 50 formed in the inside faces of the cone members 45 and 46. The outer surfaces of these cone members are adapted to co-operate with complementary cone surfaces 51 and 52 on the inner parts of the outer clutch plates 35 and 36. The angle and direction of the threads 43 and 44 are such that the application of a driving torque to the input shaft 33 tends to force the cone members 45 and 46 inwardly towards each other. The arrangement is such that at slow speeds the outer clutch plates are held in driving engagement with the inner clutch plate 38 by the springs 42 and the drive will be transmitted thereby to the output shaft. As the speed increases the centrifugal force exerted by the weights 49 will force the cone members 45 and 46 apart against the reaction created by the threads 43 and 44, thus bringing the cone members into engagement with the complementary surfaces 51 and 52 and eventually forcing the outer clutch plates 35 and 36 out of engagement with the inner clutch plate 38 and interrupting the drive. It will be seen that the operating characteristics of this arrangement are similar to those of the previously described examples, since as soon as slipping of the clutch plates commences the transmitted torque is reduced, thereby reducing the reaction force exerted by the threads 43 and 44 so that the final disengagement of the clutch takes place suddenly.

In carrying the invention into effect according to another mode as illustrated in Figure 5, the input shaft (not shown) has secured to it an elongated driving flange 53, the output shaft (also not shown) being connected to a drum 54 arranged coaxial with the input shaft. A pair of internal shoes 55 and 56 having friction surfaces 57 and 58 are arranged to bear on the inner periphery of the said drum. Helical compression springs 59 and 60 are interposed between the adjacent ends of the shoes and tend to force the friction surfaces of the shoes into driving engagement with the drum. A pair of centrifugal weights 61 and 62 are anchored on fulcrum pins 63 and 64 carried by a plate or plates supported upon the input or output shafts, or both, the purpose of the plate being to centralise the shoes when they are disengaged from the drum. A pair of links 65 and 66 connect the reaction ends of the shoes with points on the centrifugal weights lying inwardly of the fulcrum pins 63 and 64. The opposite or loaded ends of the shoes are connected by links 67 and 68 to points on the centrifugal weights lying outwardly of the aforesaid fulcrum pins. These links are slotted at 69 and 70 so that they can only draw the shoes inwardly but cannot expand them. Alternatively these slots may be provided on the links 65 and 66. A further pair of links 71 and 72 connect the ends of the driving flange 53 with the outer or free ends of the centrifugal weights 61 and 62. Inward and outward movement of the centrifugal weights upon their fulcrums is limited by stop pins 73 and 74 secured to the plate carrying the fulcrum pins and engaging in slots formed in the weights. These limiting stops also prevent the links 67 and 68 from acting in compression. The arrangement is such that with the driving flange 53 rotating counter-clockwise as viewed in Figure 5, the centrifugal force created by the weights 61 and 62 acting through the links 65, 66, 67 and 68 will oppose the springs 59 and 60 and tend to draw the shoes inwardly and disengage the clutch. The driving torque acting through the links 71 and 72 will tend to draw the weights inwardly in opposition to the centrifugal force and thus the clutch mechanism will operate with the same characteristics as those described in the previous examples.

In carrying the invention into effect according to another mode as illustrated in Figure 6, the input shaft 75 has secured to it a pair of driving arms 76 and 77 and the output shaft (not shown) has secured to it an internal drum 78. A pair of external shoes 79 and 80 have friction linings 81 and 82 which are adapted to bear on the external surface of the drum. The adjacent ends of the shoes are connected by tension springs 83 and 84 which tend to force the shoes into engagement with the drum and thus engage the clutch. Centrifugal weights 85 and 86 are pivotally anchored to the shoes at 87 and 88 and are also connected by links 89 and 90 having slots 91 and 92 to the ends of the opposite shoes. By this arrangement an outward movement of the weights causes the links 89 and 90 to act as struts to separate the shoes in opposition to the springs 83 and 84 and disengage the clutch. The slots 91 and 92 ensure that the said links cannot act to contract the shoes. The driving arms 76 and 77 carry pins 93 and 94 which engage in arcuate slots 95 and 96 formed in the centrifugal weights. These arcuate slots are struck from centres which lie on either side of the axis of the input shaft so that the driving torque transmitted by the arms 76 and 77 when rotated counter-clockwise as viewed in Figure 6 reacts on the inner surfaces of the slots tending to draw the weights inwardly in opposition to the centrifugal force. It will be seen that with this arrangement the operating characteristics of the clutch mechanism will be the same as that of the previously described examples.

In carrying the invention into effect according to another convenient mode, described by way of example as applied to a centrifugal clutch embodying change-speed gearing and arranged to effect changes in ratio in accordance with the speed of the driven element, the clutch mechanism is similar in its general construction to that shown in Figures 1 and 2, and a direct drive between the input and output shafts is afforded by a uni-directional or free-wheel clutch of the roller type. Referring to Figure 7, the input shaft 97 having a hollow portion 98 integral therewith is carried in bearings 99 in a casing 100. A flange 101 at the inner end of the said hollow portion is recessed to receive an outer clutch plate 102 to which a second outer clutch plate 103 is connected in driving relation by pins 104 which pass through both plates. Secured by the pins 104 is a bank of annular spring plates 105 which are corrugated or crimped so as to bear on the plate 103 at points between the pins and thus tend to draw the plates together. An inner clutch plate 106 having friction surfaces on both sides is disposed between the plates 102, 103 and is connected by splines 107 to a rotatably mounted sleeve 108. Centrifugal weights 109 are pivotally mounted on the clutch plate 102 and are connected by links 110 to the flange 101 of the input shaft. Trip levers 111 are actuated by outward movement of the centrifugal weights to separate the outer clutch plates 102 and 103 in the manner described in connection with the example illustrated in Figures 1 and 2. The sleeve 108 on which the inner clutch plate is mounted is formed with a gear 112 meshing with a pinion 113 which is integral with a pinion 114, the latter meshing with a pinion 115 on a sleeve 116, coaxial with the sleeve 108 and carried in bearings 117 and 118. The sleeve 116 is formed with internal serrations 119 which engage complementary serrations on a quill shaft 120, the opposite end of the said shaft being formed with serrations 121 engaging serrations on the driven or output shaft 122. An oil pump 123 is driven by a gear 124 which meshes with the gear 112 on the sleeve 108 and is adapted to deliver oil for lubrication purposes. A flange extension 125 is secured to the flange 101 on the hollow part 98 of the input shaft 97 and between this and the sleeve 116 is provided a unidirectional or free-wheel clutch 126 of the roller type.

The arrangement is such that when the speed of the input shaft is relatively low the outer clutch plates 102, 103 will be in driving engagement with the inner clutch plate 106 under the action of the springs 105, and the sleeve 108 and gear 112 will be driven at the same rotational speed as the input shaft, and through the gears 113, 114 and 115 the quill shaft 116 and the output shaft 122 will be driven at a higher speed, this being permitted by the idling of the unidirectional or free-wheel clutch 126. As the input speed is increased, the centrifugal weights tend to move outwardly about their pivots, this tendency being resisted by a force proportional to the transmitted torque due to the reaction of the driving links 110. When the speed of the input shaft reaches a predetermined value, the centrifugal force of the weights overcomes the reaction in the links and also the action of the springs 105 sufficiently to actuate the trip levers 111 and separate the plates 102, 103 to cause the clutch to slip. The consequential reduction in the transmitted torque causes a reduction in the reaction in the links, thereby transferring a portion of the centrifugal force created by the weights to the opposition of the springs and further reducing the pressure between the clutch surfaces. This results in increasing slip and hence a progressive disengagement of the clutch follows the initial slippage without any further increase in speed being required to complete the disengagement of the clutch. As soon as this occurs the drive through the gearing ceases, and when the output shaft has slowed down sufficiently a direct drive at a lower speed is afforded by the unidirectional or free-wheel clutch.

If the input speed is subsequently reduced, the inward force due to the springs acting through the trip levers will overcome the centrifugal force and the weights will move inwardly to release the trip levers, which latter will assume their original positions under the action of the springs. Although the initial contact of the clutch surfaces is not at full engagement pressure, owing to the opposition of the centrifugal force, the resulting torque reaction transmitted through the links acts in opposition to the centrifugal force and thereby allows increasing pressure to be applied to the clutch surfaces by the springs. The torque reaction is consequently increased and thus a progressive engagement of the clutch surfaces takes place until the full spring pressure is applied thereto, this progressive engagement taking place without requiring any further fall in the input speed. The drive is then transmitted to the output shaft through the gearing.

It will be appreciated that the form of the gearing employed in the above described arrangement may be widely varied, for example epicyclic gearing may be used. Also the modified forms of clutch mechanism previously described may be employed in conjunction with gearing. Such arrangements may be employed with advantage where the speed of the driven machine must not be allowed to fall below a predetermined value and the speed of the shaft from which the drive is taken is variable and may fall below such value. The invention is not limited to such arrangements, however, which may be widely varied, for example, by inversion of the elements of the gear and arrangements in which the clutch is engaged at the higher speed and disengaged at the lower speed. It is also to be understood that the invention is not limited to applications in conjunction with gearing but may be employed independently thereof.

We claim:

1. A centrifugally operated friction clutch comprising, in combination, rotatable input and output elements, a rotatable drive transmitting friction member having a drive connection with one of said elements, a second rotatable drive transmitting friction member frictionally engageable with said first rotatable friction member, means for urging said members into frictional engagement, centrifugal weight means, a rotation transmitting connection between said second rotatable friction member and the other of said input and output elements and comprising reaction producing means in rotation transmitting engagement with the centrifugal weight means having an operative connection with said weight means, independent of the means for urging the friction members into engagement, for continuously opposing outward movement of the weight means by a force substantially proportional to the torque transmitted by the friction members, and means actuated by the centrifugal weight means for effecting disengagement of the drive transmitting friction members when a predetermined higher rotational speed is exceeded, whereby following initial engagement and disengagement of the friction members at the respective lower and higher speeds such engagement and disengagement tends to proceed progressively without requiring further change in speed.

2. A centrifugally operated friction clutch comprising, in combination, rotatable input and output elements, a rotatable drive transmitting friction member having a drive connection with one of said elements, a second rotatable drive transmitting friction member frictionally engageable with said first rotatable friction member, resiliently acting means for urging said members into frictional engagement and arranged so that the force acting to engage the friction surfaces is limited to that exerted by the resilience independently of the applied torque, centrifugal weight means, a rotation transmitting connection between said second rotatable friction member and the other of said input and output elements and comprising reaction producing means in rotation transmitting engagement with the centrifugal weight means and having an operative connection therewith independent of the resiliently acting means for continuously opposing outward movement of said weight means by a force substantially proportional to the torque transmitted by the friction members, and means actuated by the centrifugal weight means for effecting disengagement of the drive transmitting friction members when a predetermined higher rotational speed is exceeded, whereby following initial engagement and disengagement of the friction members at the respective lower and higher speeds such engagement and disengagement tends to proceed progressively without requiring further change in speed.

3. A centrifugally operated friction clutch comprising, in combination, rotatable input and output elements, a rotatable drive transmitting friction member having a drive connection with one of said elements, a second rotatable drive transmitting friction member frictionally engageable with said first member by relative movement of the members in the direction of the clutch axis, springs acting along axes parallel to the clutch axis for urging said members into engagement, centrifugal weight means, a rotation transmitting connection between said second rotatable friction member and the other of said input and output elements and comprising reaction producing means in rotation transmitting engagement with the centrifugal weight means and having an operative connection independent of the aforesaid springs for continuously opposing outward movement of said weight means by a force substantially proportional to the torque transmitted by the friction members, and means actuated by the centrifugal weight means for effecting disengagement of the drive transmitting friction members when a predetermined higher rotational speed is exceeded, whereby following initial engagement and disengagement of the friction members at the respective lower and higher speeds such engagement and disengagement tends to proceed progressively without requiring further change in speed, and the maximum possible gripping power of the clutch is unaffected by the centrifugal action of the weight means and the action of the reaction producing means.

4. A centrifugally operated friction clutch comprising, in combination, rotatable input and output elements, a rotatable drive transmitting friction member having a drive connection with one of said elements, a second rotatable drive transmitting friction member engageable with said first member by relative movement of the members in the direction of the clutch axis, means for urging said members into frictional engagement, outwardly displaceable centrifugal weights pivotally connected to the second of said friction members, connections between said weights and the other of said input and output elements and comprising reaction producing means for transmitting rotation to said second friction member through the weights and having an operative connection with the latter, independent of the means for urging the friction members into engagement, for continuously opposing outward movement of the weights by a force substantially proportional to the torque transmitted by the friction members, and means actuated by outward displacement of the weights for effecting disengagement of the drive transmitting friction members when a predetermined higher rotational speed is exceeded, whereby following initial engagement and disengagement of the friction members at the respective lower and higher speeds such engagement and disengagement tends to proceed progressively without requiring further change in speed.

5. A centrifugally operated friction clutch comprising, in combination, rotatable input and output elements, a rotatable drive transmitting friction member having a drive connection with one of said elements, a second rotatable drive transmitting friction member engageable with said first member by relative movement of the members in the direction of the clutch axis, means for urging said members into frictional engagement, outwardly displaceable centrifugal weights pivotally connected to the second of said friction members, links inclined to the path of travel of said weights and pivotally connected thereto and to the other of said input and output elements forming a driivng connection therebetween, the inclination of the links being arranged continuously to oppose outward movement of the weights by a force substantially proportional to the torque transmitted by the friction members, and means actuated by outward displacement of the weights for effecting disengagement of the drive transmitting friction members when a predetermined higher rotational speed is exceeded, whereby following initial engagement and disengagement of the friction members at the respective lower and higher speeds such engagement and disengagement tends to proceed progressively without requiring further change in speed.

6. A centrifugally operated friction clutch comprising, in combination, rotatable input and output elements, a rotatable clutch plate having a drive connection with one of said elements, a pair of clutch plates coaxially disposed on opposite sides of said first clutch plate, spring means for urging said clutch plates into engagement, centrifugal weight means, a rotation transmitting connection between said pair of clutch plates and the other of said input and output elements and comprising reaction producing means in rotation transmitting engagement with the centrifugal weight means and having an operative connection with the latter independent of said spring means for continuously opposing outward movement of said weight means by a force substantially proportional to the torque transmitted by the clutch plates, and means actuated by the centrifugal weight means for effecting disengagement of the clutch plates when a predetermined higher rotational speed is exceeded, whereby following initial engagement and disengagement of the clutch plates at the respective lower and higher speeds such engagement and disengagement tends to proceed progressively without requiring further change in speed.

7. A centrifugally operated friction clutch comprising, in combination, rotatable input and output elements, a rotatable clutch plate having a drive connection with one of said elements, a pair of clutch plates coaxially disposed on opposite sides of said first clutch plate, spring means for urging said clutch plates into engagement, centrifugal weight means, a rotation transmitting connection between said pair of clutch plates and the other of said input and output elements and comprising reaction producing means in rotation transmitting engagement with the centrifugal weight means and having an operative connection with the latter independent of the spring means for continuously opposing outward movement of said weight means by a force substantially proportional to the torque transmitted by the clutch plates, bell crank levers disposed transversely with respect to the clutch plates and each having an arm extending between said pair of clutch plates and another arm operatively engageable by the weight means in the outward movement of the latter to actuate the bell crank levers and thereby effect a separation of the clutch plates of the said pair when a predetermined higher rotational speed is exceeded, whereby following initial engagement and disengagement of the clutch plates at the respective lower and higher speeds such engagement and disengagement tends to proceed progressively without requiring further change in speed.

8. A centrifugally operated friction clutch comprising, in combination, rotatable input and output elements, a rotatable clutch plate having a drive connection with one of said elements, a pair of clutch plates coaxially disposed on opposite sides of said first clutch plate, spring means for urging said clutch plates into engagement, centrifugal weights pivotally mounted on one of said pair of clutch plates, links inclined to the path of travel of said weights and pivotally connected thereto and to the other of said input and output elements forming a driving connection therebetween, the inclination of the links being arranged continuously to oppose outward movement of the weights by a force substantially proportional to the torque transmitted by the clutch plates, bell crank levers disposed transversely with respect to the clutch plates and each having an arm extending between said pair of clutch plates and another arm operatively engageable by the weights when moving outwardly to actuate the bell crank levers and thereby effect a separation of the clutch plates of the said pair when a predetermined higher rotational speed is exceeded, whereby following initial engagement and disengagement of the clutch plates at the respective lower and higher speeds such engagement and disengagement tends to proceed progressively without requiring further change in speed.

9. A centrifugally operated friction clutch comprising, in combination, rotatable input and output elements, a rotatable clutch plate having a drive connection with one of said elements, a pair of clutch plates coaxially disposed on opposite sides of said first clutch plate, pins disposed parallel to the clutch axis forming a drive connection between the plates of said pair, springs on said pins urging said pair of plates into engagement with the first plate, centrifugal weight means, a rotation transmitting connection between one of said pair of clutch plates and the other of said input and output elements and comprising reaction producing means in rotation transmitting engagement with the centrifugal weight means and continuously opposing outward movement of said weight means by a force substantially proportional to the torque transmitted by the clutch plates, and means actuated by the centrifugal weight means for effecting disengagement of the clutch plates when a predetermined higher rotational speed is exceeded, whereby following initial engagement and disengagement of the clutch plates at the respective lower and higher speeds such engagement and disengagement tends to proceed progressively without requiring further change in speed.

10. A centrifugally operated friction clutch comprising, in combination, rotatable input and output elements, a rotatable drive transmitting friction member having a drive connection with one of said elements, a second rotatable drive transmitting friction member engageable with said first member by relative axial movement of the members, means for urging said members into frictional engagement, centrifugal weights pivotally connected to said second friction member, a rotation transmitting connection between each of said weights and the other of said input and output elements and comprising a pin and slot connection having the slot inclined with respect to the path of travel of the weight to constitute a reaction producing means continuously opposing outward movement of the weight by a force substantially proportional to the torque transmitted by the friction members, and means actuated by the centrifugal weights for effecting disengagement of the drive transmitting friction members when a predetermined higher rotational speed is exceeded, whereby following initial engagement and disengagement of the friction members at the respective lower and higher speeds such engagement and disengagement tends to proceed progressively without requiring further change in speed.

11. A centrifugally operated clutch comprising, in combination, rotatable input and output elements, a rotatable drive transmitting friction member having a drive connection with one of said elements, a second rotatable drive transmitting friction member engageable with said first member by relative axial movement of the members, means for urging said members into frictional engagement, centrifugal weights pivotally connected to said second friction member, a pin on each of said weights, an arm connected to the other of said input and output elements having a curved and inclined cam slot engaged with each of said pins and constituting a driving connection for the weights and the friction member to which they are pivoted, the inclination of said cam slots being such that in driving the weights the outward movement of the latter is continuously opposed by a force substantially proportional to the torque transmitted by the friction members, and means actuated by the weights for effecting disengagement of the drive transmitting friction members when a predetermined higher rotational speed is exceeded, whereby following initial engagement and disengagement of the friction members at the respective lower and higher speeds such engagement and disengagement tends to proceed progressively without requiring further change in speed.

12. A centrifugally operated clutch comprising, in combination, rotatable input and output elements, a drum having a drive connection with one of said elements, internal shoes engageable with the drum for driving the same, spring means for effecting the required gripping engagement between the shoes and the drum, pivotally mounted centrifugal weights, connection means between one end of each weight and the corresponding shoe which connection means is formed so that only outward movement of the weight can be transmitted to the shoe, and connection means between the other end of each weight and the other of said input and output elements to constitute a driving connection for the shoes through the medium of the weights, the said connection means being arranged in relation to the pivotal mountings of the weights such that centrifugal force exerted by the weights tends continuously to contract the shoes and thereby disengage them from the drum under a force which is opposed by a force substantially proportional to the torque transmitted by the shoes to the drum, whereby following initial engagement and disengagement of the shoes and drum at the respective lower and higher speeds such engagement and disengagement tends to proceed progressively without requiring further change in speed.

13. A centrifugally operated clutch comprising, in combination, rotatable input and output elements, a drum having a drive connection with one of said elements, internal shoes engageable with the drum for driving the same, spring means interposed between adjacent shoe ends for effecting the required gripping engagement between the shoes and the drum, pivotally mounted centrifugal weights, links connecting the reaction ends of the shoes with points on the centrifugal weights which lie inwardly with respect to the clutch axis of the pivotal mountings of said weights, links connecting the loaded ends of the shoes with points on the centrifugal weights which lie outwardly with respect to the clutch axis of the pivotal mountings of said weights such connection including a pin and slot so that only outward movement of the weight can be transmitted to the shoe, and links connecting the opposite ends of the weights with the other of said input and output elements to constitute a driving connection for the shoes through the medium of the weights, the links being arranged in relation to the pivotal mountings of the weights such that centrifugal force exerted by the weights continuously tends to contract the shoes and thereby disengage them from the drum under a force which is opposed by a force substantially proportional to the torque transmitted by the shoes to the drum, whereby following initial engagement and disengagement of the shoes and drum at the respective lower and higher speeds such engagement and disengagement tends to proceed progressively without requiring further change in speed.

14. A friction clutch centrifugally disengageable at an upper speed limit comprising, in combination, means producing a substantially constant force for urging the clutch surfaces into engagement, centrifugally operable means for urging the clutch surfaces apart only, and torque responsive means operative upon said centrifugal means only and independently of the first said means for producing a force substantially proportional to the torque transmitted by the clutch surfaces and in opposition to the centrifugal means to reduce the effect of the latter, whereby the maximum possible transmissible torque is limited to a predetermined value and the operation of the clutch following initial engagement and disengagement of the clutch surfaces at the respective lower and higher speeds is such that engagement and disengagement tends to proceed progressively without requiring further change in speed.

15. A friction clutch according to claim 14, in which the means producing the substantially constant force comprise spring means independently operable on the clutch surfaces so that the maximum possible torque transmissible by the clutch is determined solely by the spring means setting.

16. A friction clutch according to claim 14, in which relative movement of the clutch surfaces takes place along the rotational axis of the clutch and the means for producing the substantially constant force comprise spring means acting parallel to said axis and independently operable on the clutch surfaces whereby the maximum possible torque transmissible by the clutch is determined by the spring setting.

17. A friction clutch according to claim 14, in which the centrifugally operable means includes pivoted weights to which rotation is transmitted by links and constituting said torque responsive means which produces an inward force on the weights to reduce the centrifugal effect thereof.

18. A friction clutch according to claim 14, in which the centrifugally operable means includes pivoted weights to which rotation is transmitted by a cam surface and constituting said torque responsive means which produces an inward force on the weights to reduce the centrifugal effect thereof.

ALBERT ARTHUR MILLER.
ANDREW GORDON WILSON.

(References on following page)

References Cited in the file of this patent

UNITED STATES PATENTS

| Number | Name | Date |
|---|---|---|
| 424,383 | Walker | Mar. 25, 1890 |
| 462,028 | Ballard | Oct. 27, 1891 |
| 698,888 | Apple | Apr. 29, 1902 |
| 1,418,350 | Asplund | June 6, 1922 |
| 1,481,593 | Fieux | Jan. 22, 1924 |
| 1,595,005 | Kappelman | Aug. 3, 1926 |
| 1,669,359 | Thomas | May 8, 1928 |
| 1,721,734 | Holman | July 23, 1929 |
| 1,805,692 | Ferenci | May 19, 1931 |
| 1,862,750 | Holman | June 14, 1932 |
| 2,056,050 | Harris | Sept. 29, 1936 |
| 2,154,591 | Waseige | Apr. 18, 1939 |
| 2,172,991 | Segard | Sept. 12, 1939 |
| 2,219,812 | Hochstetter | Oct. 29, 1940 |
| 2,380,390 | Banker | July 31, 1945 |
| 2,382,088 | Moffitt | Aug. 14, 1945 |
| 2,398,087 | Dodge | Apr. 9, 1946 |
| 2,446,703 | Honegman | Aug. 10, 1948 |
| 2,455,435 | Nader et al. | Dec. 7, 1948 |

FOREIGN PATENTS

| Number | Country | Date |
|---|---|---|
| 1,625 | Great Britain | Jan. 21, 1910 |
| 181,137 | Great Britain | Oct. 9, 1922 |